United States Patent
Puranik

(10) Patent No.: US 10,987,977 B2
(45) Date of Patent: Apr. 27, 2021

(54) SYSTEMS AND METHODS FOR MEASURING TIRE WEAR USING EMBEDDED IMAGE SENSORS

(71) Applicant: Toyota Motor North America, Inc., Plano, TX (US)

(72) Inventor: Nishikant N. Puranik, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 82 days.

(21) Appl. No.: 16/171,497

(22) Filed: Oct. 26, 2018

(65) Prior Publication Data

US 2020/0130420 A1    Apr. 30, 2020

(51) Int. Cl.
| | |
|---|---|
| *B60C 11/24* | (2006.01) |
| *G06T 7/00* | (2017.01) |
| *B60C 23/06* | (2006.01) |
| *G01M 17/02* | (2006.01) |
| *B60R 11/04* | (2006.01) |

(52) U.S. Cl.
CPC .......... *B60C 11/246* (2013.01); *B60C 11/243* (2013.01); *B60C 23/06* (2013.01); *B60R 11/04* (2013.01); *G01M 17/027* (2013.01); *G06T 7/0002* (2013.01); *G06T 2207/30252* (2013.01)

(58) Field of Classification Search
CPC ..... B60C 11/243; B60C 23/06; B60C 11/246; B60R 11/04; G01M 17/027; G06T 7/0002; G06T 2207/30252
USPC ............................................................. 73/8
See application file for complete search history.

(56) References Cited

U.S. PATENT DOCUMENTS

| | | | |
|---|---|---|---|
| 6,469,621 B1 | 10/2002 | Vredevoogd et al. | |
| 9,520,006 B1 * | 12/2016 | Sankovsky | G07C 5/02 |
| 9,873,293 B2 | 1/2018 | Singh et al. | |
| 9,963,132 B2 | 5/2018 | Singh | |
| 9,963,146 B2 | 5/2018 | Kanwar et al. | |
| 10,005,326 B2 | 6/2018 | So et al. | |
| 10,247,543 B2 * | 4/2019 | Rhoades | G01M 17/027 |

(Continued)

FOREIGN PATENT DOCUMENTS

| | | |
|---|---|---|
| FR | 2970210 B1 | 8/2013 |
| KR | 101516264 B1 | 5/2015 |
| KR | 101741730 B1 | 6/2017 |

OTHER PUBLICATIONS

"B.alert TPMS tyre management"; http://www.balert.be/en/products/tpms/; accessed Aug. 21, 2018.

*Primary Examiner* — Marrit Eyassu
(74) *Attorney, Agent, or Firm* — Dinsmore & Shohl LLP

(57) ABSTRACT

A tire wear tracking system including network interface hardware configured to communicatively couple a vehicle with a remote server, a processor, and a memory module that stores one or more processor-readable instructions. When executed by the processor, the one or more processor-readable instructions cause the tire wear tracking system to receive image data of one or more tires of a vehicle from one or more image sensors, determine tire information associated with the one or more tires, retrieve reference image data based on the determined tire information, compare the received image data with the retrieved reference image data; and generate an alert based on the comparison between the received image data and the retrieved reference image data.

18 Claims, 4 Drawing Sheets

(56) References Cited

U.S. PATENT DOCUMENTS

| | | | |
|---|---|---|---|
| 2005/0264796 A1* | 12/2005 | Shaw | G01B 11/162 356/237.2 |
| 2014/0288859 A1* | 9/2014 | Wittmann | G06T 7/60 702/55 |
| 2015/0139498 A1* | 5/2015 | Rotatori | G01B 11/02 382/104 |
| 2016/0109331 A1* | 4/2016 | Kato | B60C 23/061 73/8 |
| 2016/0343126 A1* | 11/2016 | Miller | G06T 7/0006 |
| 2017/0122842 A1* | 5/2017 | Nojek | G01M 17/027 |
| 2017/0190223 A1* | 7/2017 | Fish | H04N 7/18 |
| 2018/0222260 A1 | 8/2018 | Xue et al. | |

* cited by examiner

SYSTEMS AND METHODS FOR MEASURING TIRE WEAR USING EMBEDDED IMAGE SENSORS

TECHNICAL FIELD

The present specification generally relates to systems and methods for measuring tire wear and, more specifically, to systems and methods for measuring tire wear using embedded image sensors.

BACKGROUND

Tires generally have a tread including a plurality of grooves and are made from a relatively soft, durable material. Over the life of the tire, the tread may degrade, negatively impacting the traction of the tire and requiring tire maintenance or replacement. Tires may wear more rapidly on some vehicles than others due to multiple factors, such as tire make and model, driving style, weather conditions, road grade, and other factors. Recommendations for changing tires may be based on regular intervals (e.g., a time or distance the tires have been in use) that are calculated across an entire make and/or model of tires without accounting for differences in these factors. Accordingly, systems and methods for measuring tire wear using embedded image sensors are needed.

SUMMARY

In one embodiment, a tire wear tracking system including network interface hardware configured to communicatively couple a vehicle with a remote server, a processor, and a memory module that stores one or more processor-readable instructions. When executed by the processor, the one or more processor-readable instructions cause the tire wear tracking system to receive image data of one or more tires of a vehicle from one or more image sensors, determine tire information associated with the one or more tires, retrieve reference image data based on the determined tire information, compare the received image data with the retrieved reference image data; and generate an alert based on the comparison between the received image data and the retrieved reference image data.

In another embodiment, a vehicle includes one or more tires, one or more image sensors positioned and configured to capture image data of the one or more tires, network interface hardware configured to communicatively couple the vehicle with a remote server, a processor, and a memory module that stores one or more processor-readable instructions. When executed by the processor, the one or more processor-readable instructions cause the processor to capture image data of the one or more tires, receive reference image data from the network server with the network interface hardware, compare the captured image data with the retrieved reference image data, and generate an alert based on the comparison between the captured image data and the retrieved reference image data.

In yet another embodiment, a method of alerting a user of a vehicle to a tire wear condition of one or more tires of the vehicle includes capturing image data of one or more tires of the vehicle, retrieving reference image data, comparing the captured image data with the retrieved reference image data, and generating an alert based on the comparison between the captured image data and the retrieved reference image data.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Tires may be made from a relatively soft, durable material (e.g., rubber) that wears away as the tire is used. As tires wear, traction with a road may decrease. In order to maintain proper traction with a surface of a road, the tire may require replacement. However, it can be difficult to determine when a tire needs to be replaced.

Current methods for determining when a tire needs to be replaced may include measuring the number of miles a tire has driven and measuring the depth of the tire tread using a physical implement, such as a depth gauge. Basing tire replacement on such criteria may result in unnecessary tire changes, such as when a particular set of tires reaches a number of miles before the set actually needs to be replaced based on a tread depth, or conversely, tires that are replaced too infrequently, such as when a set of tires needs to be replaced before they have traveled a recommended number of miles.

Figure 1:
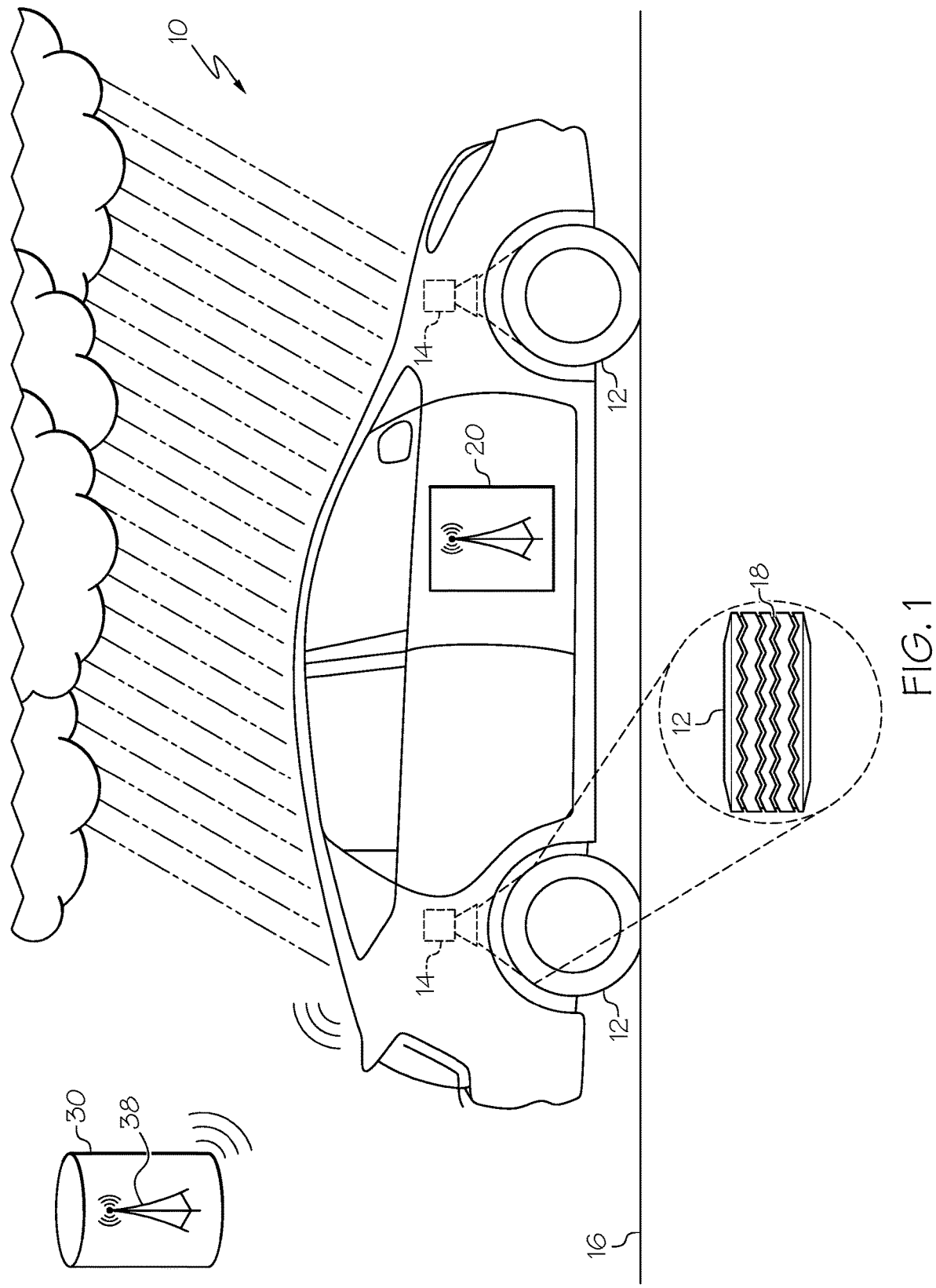
FIG. 1 depicts a vehicle including a system for measuring tire wear using embedded image sensors, according to one or more embodiments shown and described herein.

Referring generally to FIG. 1, embodiments of the present disclosure are directed to a system having one or more image sensors (e.g., cameras) configured to image individual tires of a vehicle. The cameras can capture images of the tires. The images can be processed and compared to one or more images from the same vehicle and/or other vehicles. In some embodiments, the vehicle may be connected to a network (e.g., a cloud network or an edge computing network) and the images may be compared to one or more images from other vehicles to determine a status of the tire. In some embodiments, data associated with the status of the tires on a particular vehicle may be sent to a maintenance shop and/or a tire vendor. Accordingly, systems and methods for measuring tire wear using embedded image sensors may be required. Particular embodiments of the systems and methods for measuring tire wear are described in greater detail herein.

Referring now to FIG. 1, a vehicle 10 including tires 12 and one or more image sensors 14 (e.g., cameras, LIDAR, etc.) is depicted. The vehicle 10 may include network interface hardware 20 and may be communicatively coupled with a remote server 30 that includes network interface hardware 38 for connecting with the vehicle 10 as will be described in greater detail herein. The one or more image sensors 14 are aimed at the tires 12 such that the one or more image sensors 14 can capture one or more images and other image data associated with the tire 12. The one or more image sensors 14 may be spaced apart from the tire 12 such that an entire profile of the tire 12 is in a field of view of the one or more image sensors 14 but it is contemplated that only a portion of the profile of the tire 12 may be visible by the one or more image sensors 14.

While the particular embodiment depicted in FIG. 1 shows a vehicle 10 including one image sensor 14 per tire 12, it is to be understood that in some embodiments, more than one image sensor 14 may be configured to capture images of each tire 12. In other embodiments, not all of the tires 12 of the vehicle 10 have an image sensor 14 that is configured to image the tire 12. The particular embodiment shown in FIG. 1 shows the right side of the vehicle 10 and includes two image sensors 14. It is contemplated that the vehicle 10 may include one or more tires 12 on an opposite side of the vehicle 10 and that each of the tires 12 on the opposite side of the vehicle may include an image sensor 14. In some embodiments, the vehicle 10 may be an autonomous or semi-autonomous vehicle. Additionally, while the particular embodiment shown in FIG. 1 includes a vehicle 10 with image sensors 14 above the tires 12, this is merely one potential embodiment and it is to be understood that the image sensors 14 may be configured in any position with respect to the tires 12.

Generally speaking, as the vehicle 10 drives, the tires 12 will wear such that a tread 18 of the tires 12 wears. As the tread 18 wears, one or more image sensors 14 can be used to monitor the physical condition of the tires 12, such as, for example by discerning the presence of foreign objects and/or detecting anomalies in the structure of the tires 12 and/or measure the depth of the tread 18 by capturing image data which can be compared to reference images as is described in greater detail herein. Based on the comparison between real time data and the reference images, components of the vehicle 10 may provide an alert to the driver, recommend replacing one or more tires, and/or cause one or more additional actions to be taken as described in greater detail herein.

Figure 2:
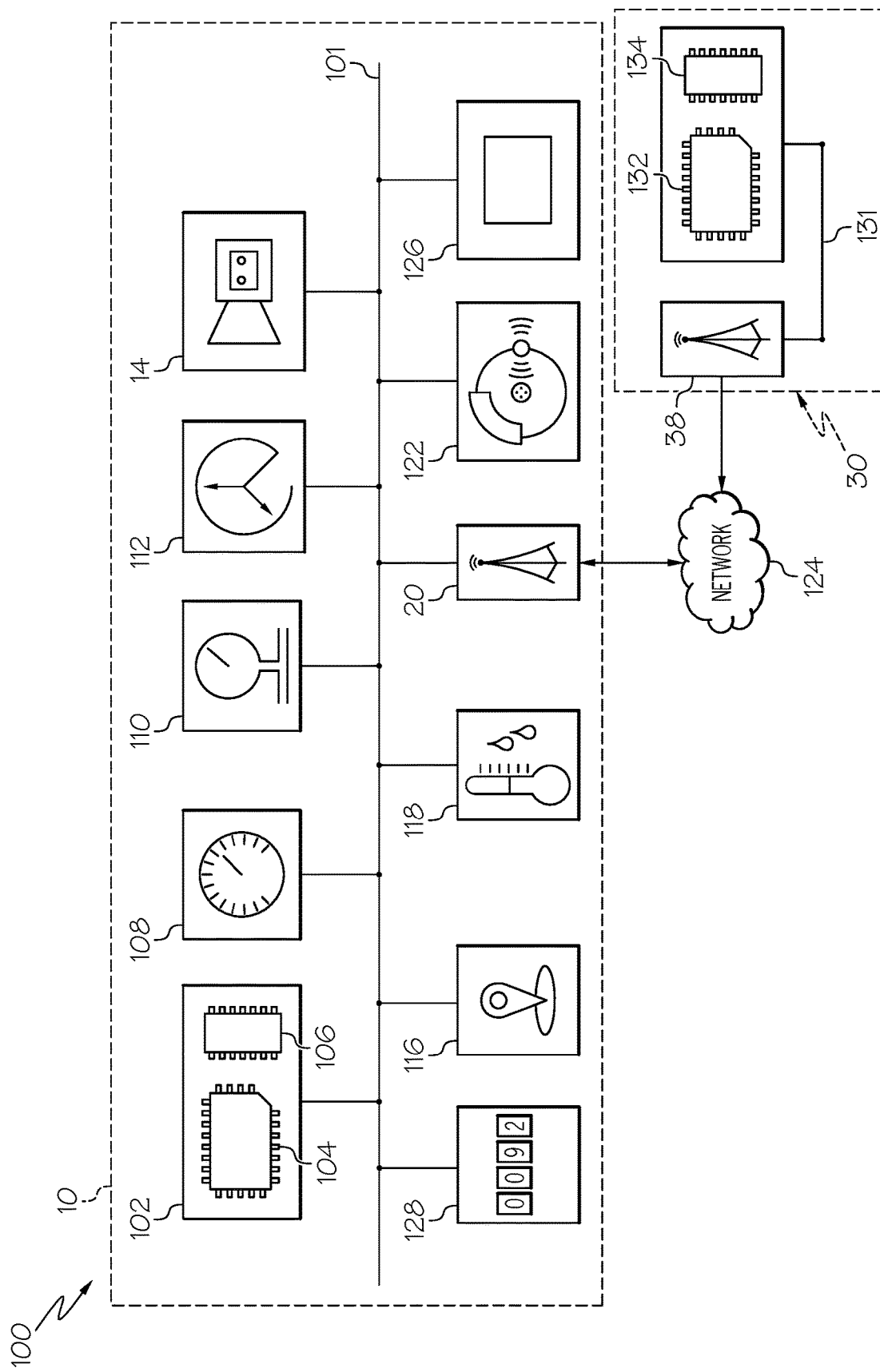
FIG. 2 schematically depicts one embodiment of a system for measuring tire wear using embedded image sensors, according to one or more embodiments shown and described herein.

Referring now to FIGS. 1 and 2, a system 100 for measuring wear of the tires 12 using embedded image sensors 14 is schematically illustrated. The system 100 includes a communication path 101 that communicatively couples an electronic control unit ("ECU") 102 including a processor 104 and a memory module 106, a speedometer 108, a tire pressure sensor 110, a motion sensor 112, a camera 114, a location sensor 116, a weather sensor 118, network interface hardware 20, a brake sensor 122, a display 126, and an odometer 128. The network interface hardware 20 may communicatively couple the vehicle 10 to a cloud network 124.

In some embodiments, the system 100 may be communicatively coupled with the remote server 30. Still referring to FIGS. 1 and 2, in some embodiments, the remote server 30 is an edge server. The remote server 30 includes a processor 132, a memory 134 that stores one or more instruction sets that may be executed by the processor 132, and network interface hardware 38 that are communicatively coupled by a communication path 131.

The communication path 101 may be formed from any medium that is capable of transmitting a signal such as, for example, conductive wires, conductive traces, optical waveguides, or the like. The communication path 101 may also refer to the expanse in which electromagnetic radiation and their corresponding electromagnetic waves traverse. Moreover, the communication path 101 may be formed from a combination of mediums capable of transmitting signals. In one embodiment, the communication path 101 comprises a combination of conductive traces, conductive wires, connectors, and buses that cooperate to permit the transmission of electrical data signals to components such as processors, memories, sensors, input devices, output devices, and communication devices. Accordingly, the communication path 101 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 101 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

Still referring to FIGS. 1 and 2, the ECU 102 may be any device or combination of components including a processor 104 and memory module 106. The processor 104 may be any device capable of executing the machine-readable instruction set stored in the memory module 106. Accordingly, the processor 104 may be an electric controller, an integrated circuit, a microchip, a computer, or any other computing device. The processor 104 is communicatively coupled to the other components of the system 100 by the communication path 101. Accordingly, the communication path 101 may communicatively couple any number of processors 104 with one another, and allow the components coupled to the communication path 101 to operate in a distributed computing environment. Specifically, each of the components may operate as a node that may send and/or receive data. While the depicted embodiment includes a single processor 104, other embodiments may include more than one processor 104.

The memory module 106 is communicatively coupled to the communication path 101 and the processor 104. The memory module 106 may comprise RAM, ROM, flash memories, hard drives, or any non-transitory memory device capable of storing machine-readable instructions such that the machine-readable instructions can be accessed and executed by the processor 104. The machine-readable instruction set may comprise logic or algorithm(s) written in any programming language of any generation (e.g., 1GL, 2GL, 3GL, 4GL, or 5GL) such as, for example, machine language that may be directly executed by the processor 104, or assembly language, object-oriented programming (OOP), scripting languages, microcode, etc., that may be compiled or assembled into machine readable instructions and stored in the memory module 106. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the depicted embodiment includes a single memory module 106, other embodiments may include more than one memory module.

The memory module 106 may store vehicle identification data and/or tire identification data. The vehicle identification data may include vehicle identifying information such as, for example, the vehicle identification number ("VIN"), serial number, a make, model, class, or style of the vehicle, a year model, or other identifying information about the vehicle. Tire identification data may include a brand, style, type, age, or classification of the tire 12. In some embodiments, tire identification data may include a serial number, PKU, or other vendor-created identifying information. Tire identification data may be classified with respect to a group of tires 12 or may be specific to an individual tire 12 such as a front-right or rear-left tire, etc. In some embodiments, the tire identification data may be updated, for example, after routine maintenance (e.g., a tire rotation).

Still referring to FIGS. 1 and 2, one or more image sensors 14 are coupled to the communication path 101 and communicatively coupled to the processor 104. In some embodiments, the image sensors 14 are cameras. While the depicted embodiment shows an icon with one image sensor 14 and reference is made herein to "image sensor" in the singular with respect to the system 100, it is to be understood that this is merely a representation and embodiments of the system 100 may include one or more image sensors 14 having one or more of the specific characteristics described herein.

In embodiments, when the one or more image sensors 14 include a camera, the camera may be any device having an array of sensing devices capable of detecting radiation in an ultraviolet wavelength band, a visible light wavelength band, or an infrared wavelength band. The camera may have any resolution. In some embodiments, one or more optical components, such as a mirror, fish-eye lens, or any other type of lens may be optically coupled to the camera. In embodiments described herein, the camera may provide image data to the ECU 102 or another component communicatively coupled to the communication path 101. The image data may include image data of the tires 12 of the vehicle 10. In some embodiments, the camera may capture image data of the roadway 16 or other aspect of a surrounding environment of the vehicle 10.

In embodiments where the one or more image sensors 14 include a camera, the camera may operate in the visual and/or infrared spectrum to sense visual and/or infrared light. Accordingly, the camera may detect thermal characteristics, changes, or gradients of the tires 12. Additionally, while the particular embodiments described herein are described with respect hardware for sensing light in the visual and/or infrared spectrum, it is to be understood that other types of sensors are contemplated. For example, the one or more image sensors 14 described herein could include one or more LIDAR sensors, radar sensors, sonar sensors, or other types of sensors.

In operation, the one or more image sensors 14 capture image data and communicate the image data to the ECU 102 and/or to other systems communicatively coupled to the communication path 101. The image data may be received by the processor 104, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

Still referring to FIGS. 1 and 2, the speedometer 108 may measure the speed of the vehicle 10. The speedometer 108 may measure a rotation speed of wheels of the vehicle 10 or of the tires 12. In some embodiments, the speedometer 108 may receive a position signal from the location sensor 116 and measure a change in the position of the vehicle 10 based on the location of the vehicle 10 to determine a speed of the vehicle 10.

The tire pressure sensor 110 may include one or more pressure gauges, pressure detectors, differential pressure detectors, or other devices for measuring an air pressure of the tires 12. The tire pressure sensor 110 may receive the pressure signal and generate one or more signals or send other data to the ECU 102 and/or one or more other components of the system 100.

The motion sensor 112 may detect and/or measure motion and changes in motion of the vehicle 10. The motion sensor 112 is coupled to the communication path 101 and communicatively coupled to the one or more processors 104. The motion sensor 112 may include inertial measurement units. The motion sensor 112 may include one or more accelerometers and one or more gyroscopes. The motion sensor 112 may transform sensed physical movement of the vehicle 10 into a signal indicative of an orientation, a rotation, a velocity, or an acceleration of the vehicle 10.

The location sensor 116 may be configured to obtain and update positional information of the vehicle 10 and to display such information to one or more users of the vehicle 10. The location sensor 116 may be able to obtain and update positional information based on geographical coordinates (e.g., latitudes and longitudes), or via electronic navigation where the location sensor 116 may electronically receive positional information through satellites. In certain embodiments, the location sensor 116 may be a GPS sensor or other component in a GPS system.

The weather sensor 118 may include one or more of a moisture sensor, a light sensor, a barometer, a wind gauge, or other sensor configured to sense a condition of the external environment. As one non-limiting example of the weather sensor 118, a moisture sensor may detect the presence of moisture on a surface, such as a road, or in the air, such as humidity, and thus may help determine a present or future weather condition (e.g., determine whether it is raining). As another example, a light sensor may be used to determine the external lighting characteristics of the environment in which the vehicle 10 is operating (e.g., to determine whether it is day or night). The present or future weather condition or the external lighting characteristics, for example, may be used as inputs to affect one or more changes to system 100.

The network interface hardware 20 may be coupled to the communication path 101 and communicatively coupled to the ECU 102. The network interface hardware 20 may be any device capable of transmitting and/or receiving data with external vehicles or servers directly or via a network, such as the cloud network 124. Accordingly, network interface hardware 20 can include a communication transceiver for sending and/or receiving any wired or wireless communication. For example, the network interface hardware 20 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 20 may include hardware configured to operate in accordance with the Bluetooth wireless communication protocol and may include a Bluetooth send/receive module for sending and receiving Bluetooth communications.

The brake sensor 122 may generate a brake pedal signal based on a position, a speed, and/or an acceleration of a depression of a brake pedal and/or an acceleration pedal of the vehicle 10. In embodiments, the brake sensor 122 may be a positional sensor that alters an electrical output based on a position, velocity, or acceleration of a brake pedal. In some embodiments, the brake sensor 122 may be electronically coupled to the vehicle brakes and may alter an electrical output based on a position, velocity, or acceleration of one or more components of the vehicle brakes. For example, the brake sensor 122 may be a potentiometer that develops an electrical potential based on a position of a brake caliper or other component of a vehicle brake.

In some embodiments, the vehicle 10 may be communicatively coupled to a network such as the cloud network 124. In embodiments, the cloud network 124 may include one or more computer networks (e.g., a personal area network, a local area network, grid computing network, wide area network, etc.), cellular networks, satellite networks and/or a global positioning system and combinations thereof. Accordingly, the vehicle 10 can be communicatively coupled to the cloud network 124 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The display 126 may provide visual output such as, for example, information or notifications pertaining to the status of the tires 12 and/or the system 100 for measuring tire wear. The display 126 is coupled to the communication path 101 and communicatively coupled to the one or more processors 104. The display 126 may include any medium capable of transmitting an optical output such as, for example, light emitting diodes, a liquid crystal display, a plasma display, or the like. In some embodiments, the display 126 may include a combination meter positioned on a dashboard of the vehicle 10. It is noted that the display 126 can include at least one of the one or more processors 104 and/or at least one of the one or memory modules 106. Additionally, it should be understood that in some embodiments, the system 100 does not include the display 126, such as in embodiments in which the system 100 does not provide visual output of information or notifications pertaining to the tires 12 and/or the system 100 for measuring tire wear.

The odometer 128 may measure the distance the vehicle 10 has traveled in a particular unit (e.g., miles, kilometers, etc.) and display such a distance to users of the vehicle 10 (e.g., on the display 126 or in a dashboard of the vehicle 10). The odometer 128 may output an analog or a digital reading. In some embodiments, the odometer 128 may be configured such that one or more settings of the odometer 128 are reset when one or more new tires 12 are installed on the vehicle 10 such that the odometer 128 can measure the number of distance units (e.g., miles, kilometers, etc.) that the particular tires 12 have traveled. In some embodiments, the memory module 106 may include one or more instructions that cause the vehicle 10 to track an age of the tires 12 in distance based on a current odometer reading when the tires 12 are installed on the vehicle 10 such that the vehicle 10 can maintain an accurate log of the distance covered by each of the one or more tires 12. In some embodiments, the odometer 128 may be communicatively coupled to the communication path 101 and may be an input to one or more other systems. In some embodiments, the odometer reading may be used as an input in calculating an expected wear condition of the one or more tires 12 as discussed in greater detail herein.

In some embodiments, the ECU 102 or other component may be configured to determine a driver profile based on the input from one or more components of the system 100, for example, the speedometer 108, the tire pressure sensor 110, the motion sensor 112, the one or more image sensors 14, the location sensor 116, and the brake sensor 122. The driver profile may be an analysis of a driver's propensity for performing particular driving behaviors or other actions associated with the vehicle 10. For example, the ECU 102 may be configured to measure a condition of the vehicle brakes using an input form the brake sensor 122 for example, using a braking intensity or braking pattern to determine a braking style of a particular user. In other embodiments, the driver profile may be used to determine a particular driver's propensity for operating a vehicle with particular characteristics. For example, if a particular driver tends to keep the tire pressure in one or more tires 12 in the vehicle 10 below a recommended tire pressure band, the ECU 102 may keep a record of such a tendency. Such inputs may be used by the system 100 as described in greater detail herein.

In some embodiments, the vehicle 10 may be partially or fully autonomous (e.g., the vehicle 10 may have an autonomy level from 0-5). In embodiments in which the vehicle 10 is partially or fully autonomous, the vehicle 10 may be pre-configured to accelerate and/or brake at a particular magnitude. Other characteristics of the autonomous driving profile are possible. These autonomous driving profile characteristics may be considered a part of the driver profile in partially or fully autonomous vehicles.

Still referring to FIGS. 1 and 2, the communication path 131 may be formed from any medium that is capable of transmitting a signal such as, for example, conductive wires, conductive traces, optical waveguides, or the like. The communication path 131 may also refer to the expanse in which electromagnetic radiation and their corresponding electromagnetic waves traverse. Moreover, the communication path 131 may be formed from a combination of mediums capable of transmitting signals. In one embodiment, the communication path 131 comprises a combination of conductive traces, conductive wires, connectors, and buses that cooperate to permit the transmission of electrical data signals to components such as processors, memories, sensors, input devices, output devices, and communication devices.

Accordingly, the communication path 131 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 131 communicatively couples the various components of the remote server 130. As used herein, the term "communicatively coupled" means that coupled components are capable of exchanging signals with one another such as, for example, electrical signals via conductive medium, electromagnetic signals via air, optical signals via optical waveguides, and the like.

Still referring to FIGS. 1 and 2, the processor 132 may be any device capable of executing the machine-readable instruction set stored in the memory module 134. Accordingly, the processor 132 may be an electric controller, an integrated circuit, a microchip, a computer, or any other computing device. The processor 132 is communicatively coupled to the other components of the remote server 30 by the communication path 131. Accordingly, the communication path 131 may communicatively couple any number of processors 132 with one another, and allow the components coupled to the communication path 131 to operate in a distributed computing environment. Specifically, each of the components may operate as a node that may send and/or receive data. While the depicted embodiment includes a single processor 132, other embodiments may include more than one processor 132.

The memory module 134 is communicatively coupled to the communication path 131 and the processor 132. The memory module 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the memory module 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the depicted embodiment includes a single memory module 134, other embodiments may include more than one memory module.

Figure 3:
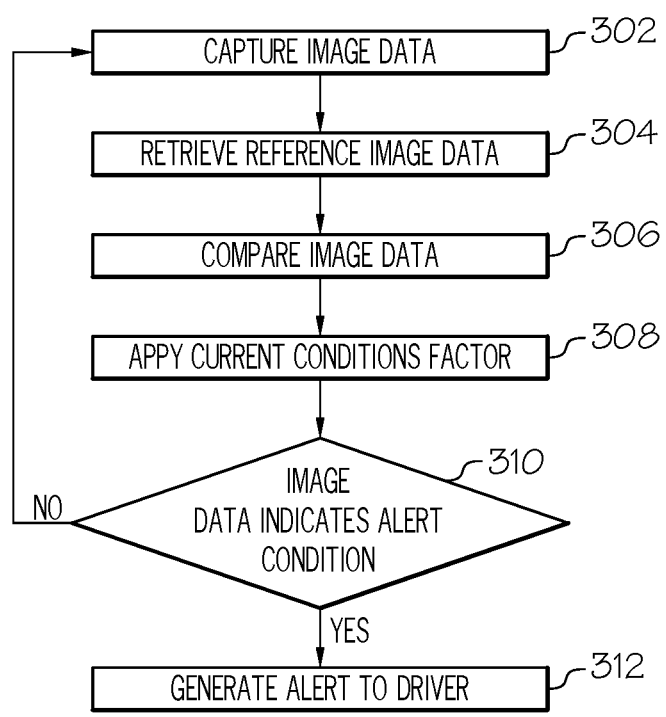
FIG. 3 depicts a flowchart listing one embodiment of a method for measuring tire wear using embedded image sensors, according to one or more embodiments shown and described herein.

Referring now to FIGS. 1, 2, and 3, a method for generating an alert to a driver of the vehicle 10 based on a comparison between captured image data and reference image data is shown and described. At step 302, the system 100 captures image data of the tires 12. The system 100 may capture image data using one or more image sensors 14. In some embodiments, each tire 12 of the vehicle 10 includes a corresponding image sensor 14. In other embodiments, there may be more or less than one image sensor 14 per tire 12 on the vehicle 10. For example, there may be one image sensor 14 per axle, or one image sensor 14 per group of tires 12 on the left side or the right side of the vehicle 10. In another example, there may be two image sensors 14 per tire 12.

In some embodiments, the captured image data may be transferred from the vehicle 10 to an external server, such as the remote server 30 for processing at the remote server 30. For example, the vehicle 10 may send the captured image data to the remote server 30 via an external data connection (e.g., a vehicle-to-infrastructure ("V2I") connection). Accordingly, the remote server 30 receives the image data of one or more tires 12 of the vehicle 10 captured by the one or more image sensors 14. In such embodiments, the remote server 30 may determine tire information associated with the one or more tires 12 and process the captured image data and take one or more of the steps discussed with respect to FIG. 3 and/or other additional or alternative steps for comparing the captured image data with reference image data.

At step 304, a reference image and associated reference image data based on the determined tire information is retrieved. The reference image and reference image data may be based on a large collection of images and/or image data of a tire and/or tires in use by the vehicle 10 and/or other vehicles. The reference image may be a standard or reference data for determining whether or not a given tire in a particular condition meets or exceeds a standard wear condition (e.g., whether or not the tire 12 is fit to continue in use on the vehicle 10 or whether the tire 12 requires some type of maintenance to include replacement). The reference image may be calculated based on various criteria as discussed herein and may be applicable to one or more vehicles, such as other vehicles having the same or similar tires as the tires 12 of the vehicle 10. In some embodiments, the reference image may be based on image data obtained by analyzing a library of images of vehicle tires as discussed in greater detail herein. The reference image, when compared to image data captured by one or more image sensors 14, is used to determine various tire conditions, for example, a wear condition of the tire 12, whether foreign objects are present within the tire 12, etc. The reference image is produced as discussed in greater detail herein. In some embodiments, the reference image is retrieved from the memory 134 of the remote server 30.

At step 306, the captured image data is compared to the reference image data. Comparison of the captured image data with the reference image data may be processed by the remote server 30 and/or the vehicle 10. For example, the vehicle 10 may send captured image data to the remote server 30 via a V2I connection and the remote server 30 may compare the capture image data with a reference image that is retrieved from a memory, such as the memory module 134 of the remote server 30.

At step 308, the vehicle 10 and/or the remote server 30 may apply a current conditions factor to the result of the comparison between captured image data and the reference image data. The current conditions factor may be based on one or more conditions affecting the operation of the vehicle 10 when the comparison between the captured image data and the reference image data is made and may make the generation of an alert to the driver based on a wear condition of the tires 12 more or less likely. For example, the current conditions factor may be based on a weather status as measured by the weather sensor 118. That is, in rainy weather, when the roads may be wet, an alert may be more likely to be generated. In another example, the current conditions factor may be based on a particular driver's driver profile. For example, if a driver is driving the vehicle 10 that is unlikely to apply the brakes sharply as measured by the brake sensor 122, an alarm is less likely to be generated. The current conditions factor may be based on inputs from each of the speedometer 108 (e.g., based on a current speed or based on a driver with a profile tending toward a particular speed), the tire pressure sensor 110 (e.g., if the tire pressure is outside of a band, it may be more likely that the tires 12 will wear quickly), the motion sensors 112 (e.g., based on a driver with a profile tending toward rapid acceleration/deceleration), the weather sensors 118, and the brake sensors 122. In some embodiments, the ECU 102 may contain one or more instructions that cause the current conditions factor to take into account the age of a particular tire 12 or set of tires 12 as measured by a reading of the odometer 128. In some embodiments, the current conditions factor may be based on the make and model of tires 12 on the vehicle 10. In some embodiments, a library or lookup table of current conditions factors may be stored in a memory of the vehicle 10 and/or the remote server 30.

At step 310, if the image data indicates an alert condition (i.e., "yes" at step 310), an alert to the driver may be generated at step 312. The alert may be displayed, for example, on the display 126. Examples of alert conditions include, but are not limited to, wear beyond a wear threshold, the presence of one or more foreign objects in one or more tires 12, or excessive wear based on the current conditions. In some embodiments, the alert may be a recommendation to replace one or more of the tires 12 of the vehicle 10. In other embodiments, the alert may be a recommendation to stop driving until one or more contributing conditions has cleared. For example, if the wear of the tires 12 would not exceed a wear threshold for a dry road, but the current weather status is raining, then the alert may persist until the road is dry. In some embodiments, the alert may include a message or alert to a tire maintenance facility that may inform the maintenance facility of a condition of the tires 12 of the vehicle 10. The maintenance facility may remind one or more users of the vehicle 10 of the condition, e.g., by sending physical and/or digital advertising material to the users of the vehicle 10. For example, if a user's tires 12 are beyond a wear threshold, a maintenance facility may be provided with a user's contact information (e.g., address, telephone number, etc.) and may contact the user with a notice that one or more of his or her tires 12 should be changed.

Figure 4:
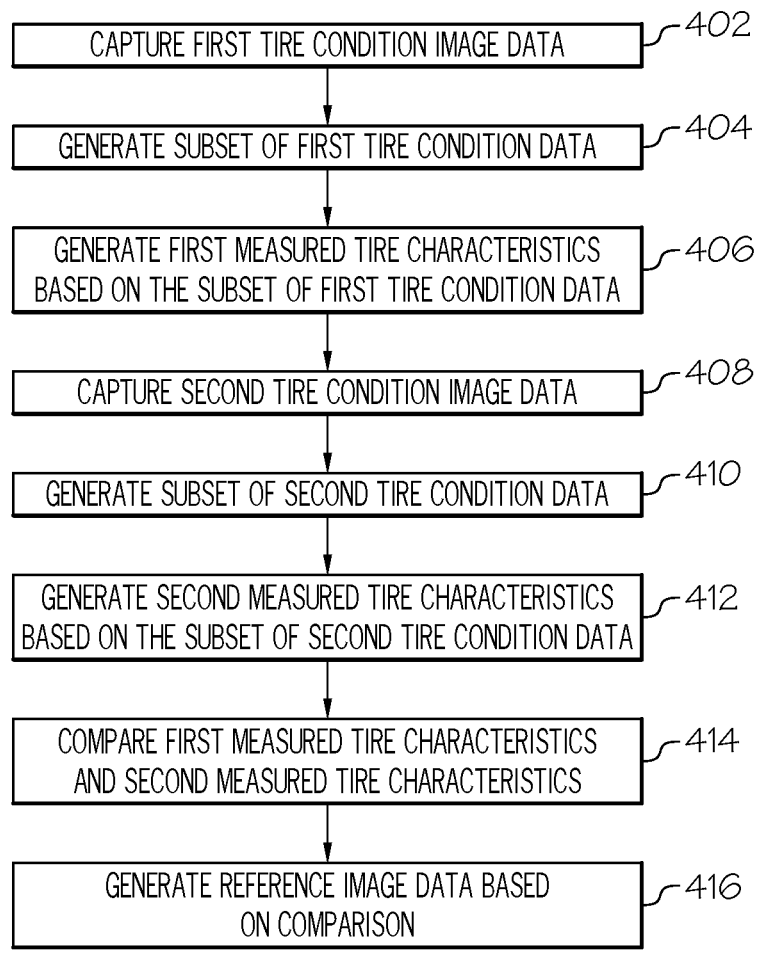
FIG. 4 depicts a flowchart listing one embodiment of a method for generating a reference image for measuring tire wear using embedded image sensors, according to one or more embodiments shown and described herein.

Referring now to FIGS. 1, 2, and 4, one embodiment of a process of generating a reference image for comparing the wear condition of the tires 12 the vehicle 10 is described. As described herein, the reference image may compared to a real-time or near real-time image captured by one or more image sensors 14 to determine a condition of the tires 12. At step 402, first tire condition data is captured. As used herein, tire condition data refers to data that reflects the condition of the tire. In some embodiments, the tire condition data may be image data captured by one or more image sensors 14. In some embodiments, the first tire condition data may be captured by a camera or other image sensor that captures images or other data of a tire on a test vehicle under test conditions. For example, in some embodiments, the first tire condition data may be captured using a tire or tires on one or more control vehicles that are operated under controlled conditions, for example, under simulated road conditions. As one example, a tire may be run on the surface of a treadmill with a road-like surface for a given period of time and/or distance. Another example of simulated conditions may include running a vehicle including multiple tires on a test track or other controlled environment for a given time and/or distance. Embodiments are not limited to or by these examples and other methods of simulating tire wear for the purpose of determining first tire condition data is contemplated.

In other embodiments, the first tire condition data may be aggregated from a large number of tires that are in non-simulated use. In some embodiments, data captured from tires in simulated use may be combined with data from tires in non-simulated use. For example, multiple non-test vehicles may include a system with one or more image sensors, such as the image sensors 14, that record the wear of a tire or tires on each of the multiple vehicles. This image data may be aggregated over an entire network of connected vehicles or a subset of such a network and averaged to determine first tire condition data. In some embodiments, the first tire condition data may be based on a combination of controlled data as discussed above and aggregated, actual-use data.

At step 404, a subset of first tire condition data is generated by filtering the first tire condition data. The filtered subset of the first tire condition data may be based on one or more characteristics and/or operating conditions that are specific to the vehicle 10. This filtering may make the first tire condition data more useful to the vehicle 10 to more accurately diagnose when the vehicle 10 needs to replace and/or repair the tires 12. For example, if the vehicle 10 has tires with a particular age, is driven by a driver with a particular driver profile, is operating in a particular weather condition, etc., then the subset of first tire condition data can be generated to only include image data from other tires that reflect those characteristics and/or operating conditions.

Non-limiting exemplary criteria includes a make, model, and/or type of vehicle. Such criteria may be useful in comparing the tire wear patterns of vehicles in the same make, model, or type. In some embodiments, the subset criteria may include location data of the vehicle as determined by the location sensor 116. For example, the subset of first tire condition data may include tires that are used only in a particular geographic location, e.g., to determine the tire condition data for tires that encounter particular weather patterns or roads using a certain material (e.g., pavement composition). In some embodiments, the subset criteria may be based on a driving profile as determined by one or more of the motion sensors 112, the speedometer 108, and/or the brake sensor 122. For example, the wear pattern of tires on vehicles that are operated in a particular manner may be compared, such as vehicles driven by drivers who tend to accelerate quickly or brake abruptly. In some embodiments, a distance traveled for a particular tire or set of tires may be measured using the odometer 128 and this distance may be used as a factor to determine a subset of tire condition data.

Using a subset of the captured image data means that some image data will necessarily be filtered out. Because a large library of images may develop based on a fleet of vehicles uploading data to the remote server, all of the image data will not necessarily be applicable to generating an alert to every driver. As one example reason for filtering image data, tires that have operated below a recommended tire pressure operating band may experience wear at a different rate than tires that operate within the recommended tire pressure operating band. Accordingly, to determine a hypothetical wear condition for an example tire that has continuously operated within a recommended tire pressure operating band, image data from vehicles having tires that have operated below the recommended tire pressure operating band may be filtered out such that such image data is not used to compare image data captured from the tires that have operated within the recommended tire pressure operating band to tires that have operated outside of the recommended tire pressure operating band when calculating an alert condition. Filtering based on the particular tire pressure band that a tire has operated in is merely one example, and it is to be understood that other criteria for filtering and comparing captured image data to reference images is contemplated as described herein.

In embodiments, image data may be stamped with metadata from one or more other components of the system 100 in order to sort and filter the image data. For example, when image data is captured by the vehicle 10, the image data may be stamped with data associated with tire pressure as measured by the tire pressure sensor 110, the driver profile for the driver of the vehicle 10 as determined by the brake sensor 122, the motion sensors 112, and the speedometer 108, location data as determined by the location sensor 116, an age of the tires 12 as determined by the odometer 128 and other data as appropriate. Image data capture by test vehicles and/or other vehicles may be stamped with metadata similarly using appropriate systems on such vehicles.

At step 406, the vehicle may generate first measured tire characteristics based on the filtered first tire condition data (i.e., the subset of first tire condition data). That is, tire wear characteristics (e.g., tread depth, number of cracks in an external surface, etc.) may be measured for the filtered first tire condition data and averaged. Other exemplary measurable aspects include, but are not limited to, shape, pattern, and color.

At step 408, second tire condition data is captured. The second tire condition data is captured similarly to the first tire condition data, except it is captured subsequent to the first tire condition data. At step 410, a subset of the second tire condition data is generated by filtering the second tire condition data. The subset of the second tire condition data can be filtered based on any of the criteria discussed above with respect to generating the subset of the first tire condition data. However, the criteria used to filter the subset of the second tire condition data is necessarily equivalent to the criteria used to filter the subset of the first tire condition data. At step 412, the second measured tire characteristics are generated based on the second subset of tire condition data. The second measured tire characteristics are generated similarly to the first measured tire characteristics as discussed above.

At step 414, the first measured tire characteristics and the second measured tire characteristics are compared to determine a difference between the first tire condition data and the second tire condition data and to determine a tire condition trend line that can be used to generate reference image data for comparison with captured image data as described with respect to FIG. 3 herein. For example, the first measured tire characteristics (e.g., a tread depth at time 1) may be compared to the second measured tire characteristics (e.g., a tread depth at time 2) to determine a change in the tread depth and this change may be divided over some period (e.g., time or distance as measured by the odometer 128) to determine what a rate of change for the measured tire characteristics.

At step 416, the comparison between the first measured tire characteristics and the second measured tire characteristics is used to generate an expected tire condition that can be used to predict a wear condition of the tires of any vehicle. That is, the comparison between the first measured tire characteristics and the second measured tire characteristics can be used to generate reference image data for any tire or set of tires. The reference image data calculated in step 416 may be used as the reference image data in the process described hereinabove with respect to FIG. 3. In some embodiments, the reference image data may be trend data that may be stored locally on the vehicle 10, such that, in the event the vehicle 10 is not in connection with the remote server 30, the vehicle 10 can still generate an alert to the user of the vehicle 10 based on the wear condition of the tires 12. For example, the reference image data may comprise tire condition trend data, for example, tread measurements or tread pattern data over time. For example, the reference image data may comprise data that shows that one of the tires 12 will wear at a rate of 1 mm per every 400 miles driven on the tire 12. This trend data could be used to determine an expected time and/or an expected alert condition based on the current conditions of the tires 12 (i.e., based on a current tread depth of 50 mm, an alert condition tread depth of 40 mm, and a wear rate of 1 mm for 400 miles, the system 100 may determine that the vehicle 10 will reach an alert condition in another 4,000 miles). The expected alert condition could be saved and an actual alert could be generated if conditions equivalent to the expected alert condition actually occur.

Referring now to FIGS. 1 and 2, an example scenario for generating an alert to the driver of the vehicle 10 based on a wear condition of the tires 12 of the vehicle 10 is described. The vehicle 10 is operating on a roadway 16 that is wet due to precipitation. The vehicle 10 is communicatively coupled with the remote server 30 via the network interface hardware 38 and the network interface hardware 20. The image sensors 14 capture image data of the tires 12 and send the image data to the remote server 30. Along with the image data, the vehicle 10 sends identifying information and other tire information associated with the tires 12 to the remote server 30. For example, the vehicle 10 sends the make and model and the age of the tires 12 (e.g., the number of miles the tires 12 have been driven, the amount of time the tires 12 have been in use, etc.) to the remote server 30. The identifying information is used in the calculation of the reference image data as described herein.

The remote server 30 compares the image data sent from the vehicle 10 to reference image data that is calculated as described above with respect to FIG. 4. The reference image data is based on a filtered subset of image data captured by a network of vehicles similar to the vehicle 10 that are each capturing image data of their own tires and uploading the data to a remote server 30. This uploaded data forms a library of image data that can be sorted and filtered as described herein with respect to FIG. 4. Accordingly, the remote server 30 may compare the uploaded image data from the vehicle 10 to a subset of all of the images in the library of images. Once the image data captured by the image sensors 14 and sent from the vehicle 10 is compared to the reference image data generated by the remote server 30, the current conditions factor is applied as described above.

The current conditions factor may be based on the current conditions in the environment surrounding the vehicle 10. For example, because the roadway 16 is wet, the traction of the tires 12 reduced. Accordingly, the tread 18 may be less likely to prevent a loss of traction with the roadway 16. Thus, in such a scenario, an alert may be more likely. Other non-limiting examples of factors that affect the current conditions factor include aspects that make up a driver profile. For example, an acceleration profile or braking profile of a particular driver. In the particular example shown in FIG. 1, the driver may prefer heavy acceleration and heavy braking. Accordingly, the current conditions factor may be applied such that it is more likely that the vehicle 10 will generate an alert to the driver based on the tread condition of the tires 12 as described herein.

It should now be understood that a system having one or more image sensors (e.g., cameras) pointed at individual tires of a vehicle can be used to generate an alert to one or more drivers of the vehicle regarding the condition of the tires. The cameras can capture images of the tires. The images can be processed and compared to one or more images from the same vehicle and/or other vehicles. In some embodiments, the vehicle may be connected to a network (e.g., a cloud network or an edge network) and the images may be compared to one or more images from other vehicles to determine a status of the tire. In some embodiments, data associated with the status of the tires on a particular vehicle may be sent to a maintenance shop and/or a tire vendor. Accordingly, systems and methods for measuring tire wear using embedded image sensors may be required. Particular embodiments of the systems and methods for measuring tire wear are described in greater detail herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tire wear tracking system comprising:
   network interface hardware configured to communicatively couple a vehicle with a remote server;
   a processor; and
   a memory module that stores one or more processor-readable instructions that when executed by the processor cause the tire wear tracking system to:
   receive image data of one or more tires of a vehicle from one or more image sensors;
   determine tire information associated with the one or more tires;
   detect tire condition data of the one or more tires, wherein the tire condition data comprises at least one of a location of the vehicle or a driver profile;
   retrieve reference image data based on the determined tire information;
   filter the retrieved reference image data based on the tire condition data;
   generate a current conditions factor;
   compare the received image data with the retrieved and filtered reference image data;
   apply the current conditions factor to the comparison between the received image data and the retrieved and filtered reference image data; and
   generate an alert based on the comparison between the received image data and the retrieved and filtered reference image data with the current conditions factor applied thereto.

2. The system of claim 1, wherein the alert is generated based on a wear condition of the one or more tires as compared to the retrieved and filtered reference image data.

3. The system of claim 1, wherein the current conditions factor is based on-one or more of a current weather condition, a speed of the vehicle, a tire pressure, a velocity or acceleration profile, a brake life, and an age of the one or more tires.

4. The system of claim 1, wherein the reference image data is generated by the remote server.

5. The system of claim 1, wherein the reference image data is generated by comparing first tire condition data with second tire condition data.

6. The system of claim 5, wherein the first tire condition data and the second tire condition data are based on image data collected from a plurality of vehicles, each of the plurality of vehicles including one or more cameras configured to capture image data of their respective tires.

7. The system of claim 5, wherein the first tire condition data and the second tire condition data is based on image data collected from tires on one or more control vehicles.

8. The system of claim 1 wherein the generated alert is sent to a tire service facility.

9. The system of claim 1, wherein the current conditions factor is based on one or more of a current weather condition, a speed of the vehicle, a tire pressure, a driver profile, a brake life, and an age of the one or more tires at the time of the comparison between the received image data and the retrieved and filtered reference image data.

10. A vehicle comprising:
    one or more tires;
    one or more image sensors positioned and configured to capture image data of the one or more tires;
    network interface hardware configured to communicatively couple the vehicle with a remote server;
    a processor; and
    a memory module that stores one or more processor-readable instructions that when executed by the processor cause the processor to:
    receive image data of the one or more tires;
    detect tire condition data of the one or more tires, wherein the tire condition data comprises at least one of a location of the vehicle or a driver profile;
    retrieve reference image data from the network server with the network interface hardware;
    filter the retrieved reference image data based on the tire condition data;
    generate a current conditions factor;
    compare the received image data with the retrieved and filtered reference image data;
    apply the current conditions factor to the comparison between the received image data and the retrieved and filtered reference image data; and
    generate an alert based on the comparison between the received image data and the retrieved and filtered reference image data with the current conditions factor applied thereto.

11. The vehicle of claim 10, wherein the current conditions factor is based on one or more of a current weather condition, a speed of the vehicle, a tire pressure, a velocity or acceleration profile, a brake life, and an age of the one or more tires.

12. The vehicle of claim 10, wherein the reference image data is generated by comparing first tire condition data with second tire condition data.

13. The vehicle of claim 12, wherein the first tire condition data and the second tire condition data are based on image data collected from a plurality of vehicles, each of the plurality of vehicles including one or more cameras configured to capture image data of their respective tires.

14. The vehicle of claim 10, wherein the reference image data comprises tire condition trend data.

15. The vehicle of claim 14, wherein tire condition trend data is saved locally at the vehicle and used to generate an alert based on a comparison between captured image data and the tire condition trend data.

16. A method of alerting a user of a vehicle to a tire wear condition of one or more tires of the vehicle comprising:
    receiving image data of one or more tires of the vehicle;
    detecting tire condition data of the one or more tires, wherein the tire condition data comprises at least one of a location of the vehicle or a driver profile;
    retrieving reference image data;
    filtering the retrieved reference image data based on the tire condition data;
    generating a current conditions factor;
    comparing the received image data with the retrieved and filtered reference image data;
    applying the current conditions factor to the comparison between the received image data and the retrieved and filtered reference image data; and
    generating an alert based on the comparison between the received image data and the retrieved and filtered reference image data with the current conditions factor applied thereto.

17. The method of claim 16, wherein the current conditions factor is based on one or more of a current weather condition, a speed of the vehicle, a tire pressure, a velocity or acceleration profile, a brake life, and an age of the one or more tires.

18. The method of claim 16, wherein the reference image data is based on a comparison of first tire condition data with second tire condition data.

* * * * *